Figure 1:
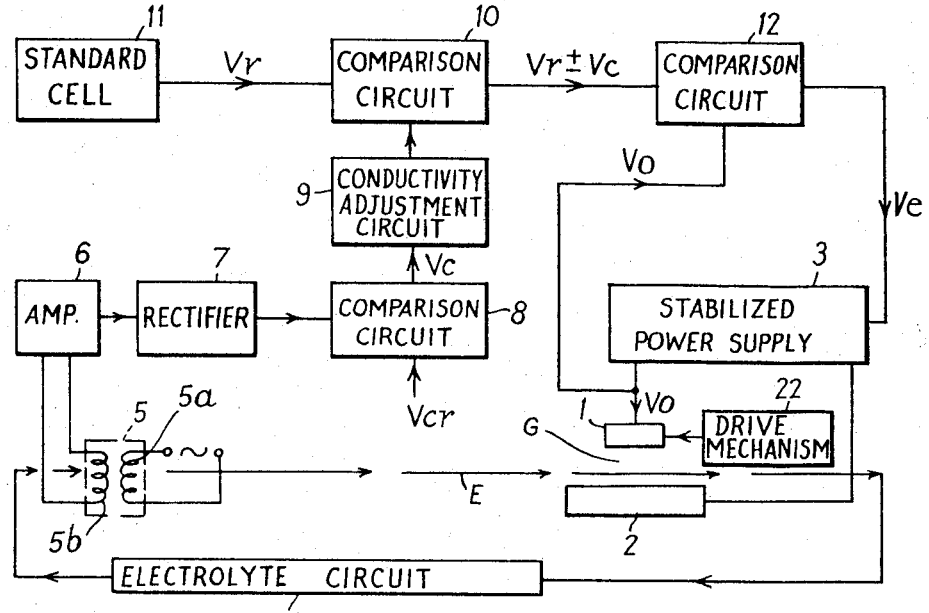

3,440,156
ELECTROCHEMICAL MACHINING INCLUDING CONTROLLING THE GAP VOLTAGE USING A CONSTANT ELECTRODE ADVANCE
Eric Winston Dickson, Leamington Spa, England, assignor to Associated Engineering Limited, Leamington Spa, England
Filed May 2, 1966, Ser. No. 546,918
Claims priority, application Great Britain, May 4, 1965, 18,834/65
Int. Cl. B23p 1/04
U.S. Cl. 204—143          13 Claims The present invention relates to a method and apparatus for carrying out electrochemical machining. That is to say, a machining process in which a metal or metallic workpiece and a tool are connected in an electric circuit with the workpiece forming an anode and the tool a cathode so that a unidirectional current can flow between the tool and the workpiece through an electrolyte which is present between them. In this way material is electrolytically removed from the workpiece in accordance with the configuration of the tool. Means are provided for advancing the tool towards the workpiece as the material of the latter is removed and its machined portion recedes ahead of the tool. In practice a stream of electrolyte is caused to flow through the working gap between the tool and the workpiece in order to remove the products of the electrochemical reaction and present fresh electrolyte in the working gap.

The initial accuracy and repeatability of an electrochemical machining operation depend upon the stability of the working gap between the tool and workpiece. The working gap is not usually the same over the whole of the working surface because of geometric and electrolyte flow factors. However, if these factors are kept substantially constant, as is the case for the machining of repetitive workpieces, the accuracy depends solely upon the applied voltage between the tool and workpiece, the tool advance rate and the electrolyte conductivity.

The present invention provides means whereby the applied voltage is controlled and modified according to the electrolyte conductivity; the other parameter, tool advance rate, being kept constant during the machining process.

Assuming that the working gap behaves ohmically, it can then be shown that the working gap is approximately proportional to the product of the applied voltage and the specific electrolyte conductivity, or in other words the ratio $v/s$, where $v$ is the applied voltage and $s$ is the specific resistance of the electrolyte. Hence, in order to maintain an approximately constant working gap, assuming that other factors are kept constant as hereinbefore mentioned, it is necessary to provide a fractional change in applied voltage equal and opposite to the fractional change in specific conductivity.

However, since the working gap is not a strictly ohmic impedance in relation to the voltage applied between the tool and the workpiece, due to the potential drops which occur at the interfaces between the tool and the electrolyte and the workpiece and the electrolyte, a more nearly constant working gap can only be obtained by taking into account these potential drops at the interfaces. Moreover, it is not necessarily true that the specific resistance of the electrolyte at points on a line across the working gap will be constant. Variations can be expected because of the change in electrolyte velocity and therefore replacement rate, at various points across the gap. These variations are dependent on flow rate and therefore the electrolyte flow rate should be maintained constant to maintain the pattern of specific resistance variations across the gap.

However, the relationship between the conductivity of the electrolyte supplied to the working gap and the voltage applied between the tool and the workpiece is such that for a given electrolyte conductivity there is only one voltage at which the desired working gap can be obtained. The converse is also true, i.e. for a given applied voltage there is a unique value of the conductivity of the electrolyte supplied to the working gap which will produce a desired value of working gap.

It is an object of the present invention to provide means for maintaining a substantially constant equilibrium working gap whilst carrying out an electrochemical machining operation.

It is a further object of the present invention to provide such means enabling the accurate repetition of a machining operation on successive workpieces.

It is another object of the invention to provide means for maintaining a substantially constant equilibrium working gap during an electrochemical machining operation, in which the relative advance rate between the tool and workpiece is maintained constant and the operation commences from predetermined values of applied voltage, working gap and electrolyte flow conditions.

From one aspect, the invention provides apparatus for carrying out electrochemical machining in which a workpiece and a tool are connected in an electric circuit with a voltage stabilized power supply so that the workpiece forms an anode and the tool a cathode, and an electrolyte is caused to flow through a gap between the tool and the workpiece at a substantially constant flow rate and including means for relatively moving the tool towards the workpiece at a constant advance rate as the material of the workpiece is removed, means for producing a signal dependent on the electrolyte conductivity and means for controlling the voltage applied between the tool and the workpiece across the working gap by means of the signal dependent on the electrolyte conductivity, whereby a substantially constant equilibrium working gap can be maintained throughout a machining operation.

The invention also provides a method of carrying out electrochemical machining in which a workpiece and a tool are connected in an electric circuit with a voltage stabilized power supply so that the workpiece forms an anode and the tool a cathode and an electrolyte is flowed at a substantially constant rate through a gap between the tool and the workpiece and including the steps of relatively moving the tool towards the workpiece at a constant advance rate as the material of the workpiece is removed, producing an output signal dependent on the electrolyte conductivity and controlling the voltage applied between the tool and the workpiece across the working gap by means of the signal dependent on the electrolyte conductivity, whereby a substantially constant equilibrium working gap can be maintained throughout a machining operation.

According to one form of the invention, a conductivity measuring device which provides an output signal proportional to the electrolyte conductivity is used to vary the output voltage of the direct current supply applied between the tool and the workpiece and so correct any tendency for the working gap to alter.

According to an alternative form of the invention, which assumes that the electrolyte composition remains unchanged, the control of the applied voltage is based upon measurement of the temperature of the electrolyte as a sufficient guide to the changes in its conductivity.

Figure 2:
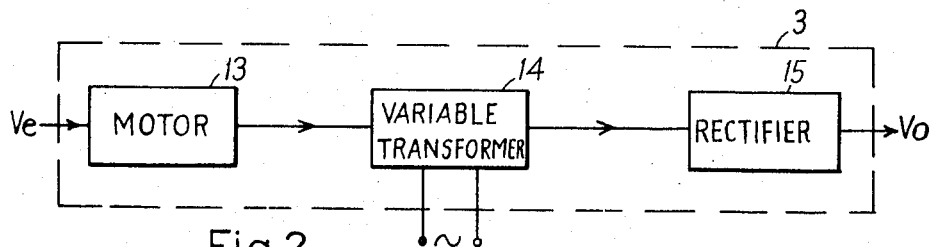
Figure 3:
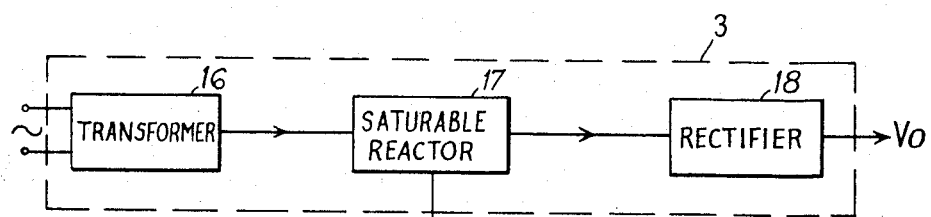
Figure 4:
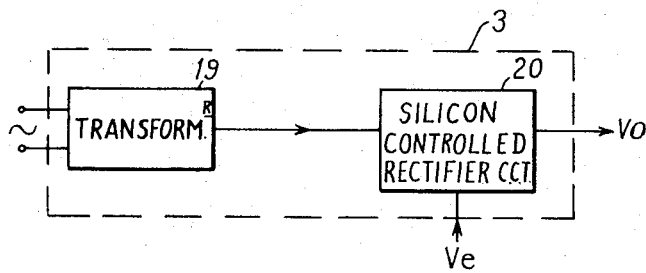
Figure 5:
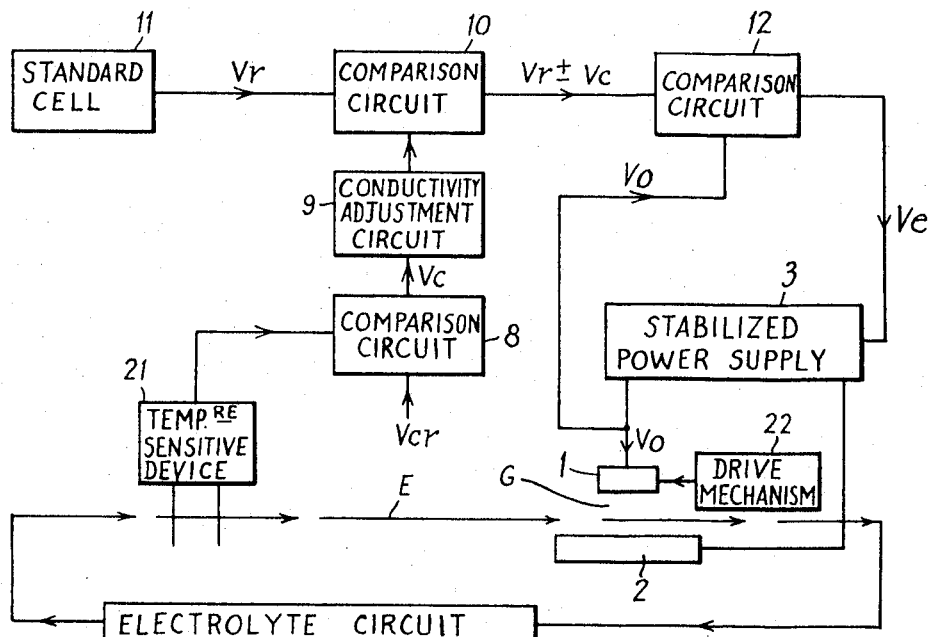

In order that the invention may be more fully understood, reference will now be made to the accompanying drawings in which:

FIGURE 1 is a block diagram of one embodiment of apparatus for carrying out the method according to the invention, FIGURES 2, 3 and 4 show respectively block diagrams of three different forms of voltage stabilized power supply, and FIGURE 5 shows a modification to the apparatus of FIGURE 1.

Referring to FIGURE 1, the apparatus comprises a tool 1, for electrochemically machining a workpiece 2. The tool and workpiece are connected to the output from a voltage stabilized power supply 3, such that the workpiece forms an anode and the tool a cathode. The voltage employed may for example be in the range from 3 to 30 volts. A liquid electrolyte, for example a solution of sodium chloride in water, indicated by the arrows E, is caused to flow through the working gap G between the tool and the workpiece. The electrolyte circuit 4, includes a storage tank, pump, filter, temperature and flow control means, as is well known in the art. A drive mechanism 22, such as a nut and leadscrew mechanism driven by an electric motor, is provided for moving the tool towards the workpiece at a constant advance rate, as the material of the workpiece is removed by the electrochemical machining operation.

The voltage $Vo$ applied between the tool 1 and the workpiece 2, across the working gap G is controlled by a signal dependent on the electrolyte conductivity so that a substantially constant equilibrium working gap can be maintained throughout a machining operation. As is well understood in the art, the working gap does not remain constant during the initial part of an electrochemical machining operation, but takes some finite time to reach its equilibrium value.

A signal proportional to electrolyte conductivity is produced by means of the conductivity probe 5 comprising two coupled coils 5a, 5b immersed in the electrolyte and between which the electrolyte flows. The coil 5a is fed with an alternating signal, and an output signal varying in dependence of the conductivity of the electrolyte is derived from the coil 5b and fed through the amplifier 6 and rectifier 7 to the comparison circuit 8 which is also fed with a conductivity reference voltage $Vcr$, derived from a suitable source such as a standard cell. The output $Vc$ from this comparison circuit 8 is fed through a conductivity adjustment circuit 9 to a further comparison circuit 10 which is fed with a reference voltage $Vr$, for example provided by the standard cell 11. The output control voltage $Vr \pm Vc$ from this comparison circuit is applied to another comparison circuit 12 which is also fed with the output voltage $Vo$ from the power supply and which in turn produces an error voltage $Ve$ which is fed to control the output voltage from the power supply 3 in order to adjust the output voltage, as necessary, to maintain a substantially constant equilibrium working gap between the tool and the workpiece.

In order to carry out a machining operation with the apparatus as described, the apparatus is set up with a given electrolyte composition and temperature, whilst the operating voltage is chosen to give the required working point with that electrolyte, as determined by experience to be the optimum within the capabilities of the apparatus. It will be appreciated that the rate of flow of electrolyte is limited by the capacity of the pump and other components of the electrolyte circuit 4 and that this rate of flow determines to some extent the working gap at which a particular machining operation should desirably be carried out.

The conductivity reference voltage $Vcr$ is set up to equal the rectified output signal from the conductivity probe 5 at the nominal conductivity of the electrolyte to be used in the machining operation. Under these conditions there is no output signal from the comparison circuit 8. However, any departure of the electrolyte conductivity signal from this nominal value, produces a signal $Vc$ which is fed to the comparison circuit 10, which also receives the reference voltage $Vr$. This reference voltage is made equal to the desired value for the applied voltage $Vo$ across the working gap at the chosen nominal conductivity of the electrolyte. Thus, providing that there is no conductivity signal $Vc$, the output from the comparison circuit 10 is merely the reference voltage $Vr$ which is compared in the comparison circuit 12 with the output voltage $Vo$ from the power supply 3. Under balanced conditions the two voltages are equal and no error voltage $Ve$ is fed to the power supply to change its output voltage. If the conductivity voltage $Vc$ is present, this also appears in the output control signal from the comparison circuit 10 and when compared with the output voltage from the power supply in the comparison circuit 12, produces an error signal $Ve$ which is applied to the power supply 3 to vary the output voltage $Vo$ in a direction to make the error signal $Ve$ equal to zero, and hence to maintain a substantially constant equilibrium working gap.

The magnitude of the conductivity dependent voltage $Vc$ for a given change in electrolyte conductivity can be varied by adjusting the gain of the conductivity adjustment circuit 9 which may be a variable gain amplifier, or other variable gain device. Where the circuit operates on variable DC signals, as in the embodiment described, the comparison circuits 8, 10 and 12 may be simple resistor networks performing an algebraic addition function on the two voltages fed thereto and producing an output voltage proportional to either the sum or difference of the two input voltages depending upon the output which is required.

It will be understood that the circuit may also be constructed to operate with alternating current signals instead of DC signals, in which case the comparison circuits may comprise either resistive networks as described above, or other types of comparison circuits for alternating current signals, as are well known in the electronic art.

Referring now to FIGURES 2, 3 and 4, these show in block diagram form, three different arrangements which the stabilized power supply 3 may take. In FIGURE 2, the power supply comprises a motor 13 fed with the error signal $Ve$ and driving a variable transformer 14 fed with an alternating supply and whose output is fed through a rectifier circuit 15 to produce the voltage $Vo$ to be applied between the tool and the workpiece.

In FIGURE 3, the voltage stabilized power supply comprises a transformer 16 which is fed with an alternating supply and which feeds a saturable reactor 17 controlled by the output signal $Ve$ from the comparison circuit 12. The output of the saturable reactor is fed through a rectifier arrangement 18 to produce the output voltage $Vo$ applied across the working gap between the tool and the workpiece.

In FIGURE 4, the voltage stabilized power supply comprises a transformer 19 fed with an alternating supply and which feeds a rectifier circuit 20 incorporating silicon controlled rectifiers whose control electrodes are fed with the error signal $Ve$ from the comparison circuit 12. The output from the rectifier circuit 20 is again the voltage $Vo$.

It will be understood that the error signal $Ve$ may be converted and/or amplified, by means well known in the electronic art, as and if necessary for it to be in a suitable form to control the component to which it is applied in the stabilized power supply.

FIGURE 5 shows a modification of the circuit of FIGURE 1 in which the conductivity probe 5, amplifier 6, and rectifier 7 are omitted and the electrolyte conductivity is determined by measuring the temperature by means of a temperature sensitive element 21, comprising a thermoelectric device, or a resistive or semiconductor device whose resistance changes with temperature. The output of temperature sensitive element 21 is fed as an input signal to the comparison circuit 8 where it is compared with the conductivity reference voltage Vcr. The circuit otherwise comprises the same components as the circuit of FIGURE 1 and operates in a generally similar manner.

The conductivity of electrolytes is mainly determined by the salt content and temperature. At higher salt concentrations the rate of change of conductivity with salt content decreases, and for a given temperature specific gravity measurements are a sufficient guide to the conductivity of the solution. The conductivity of the electrolyte increases with increasing temperature and according to this form of the invention, means are provided whereby the resultant tendency to an increase in working gap is counteracted and minimised by a decrease in applied voltage, thus maintaining the working gap substantially constant.

Although a system can be devised in which the range of temperature variation of the electrolyte is not limited, it is generally preferable in practice, with both the conductivity and temperature sensing embodiments, that a simple temperature control system be provided in the electrolyte circuit 4, which proves advantageous in limiting the temperature range of the electrolyte. Over this limited range of temperature, say $\pm 10°$ F. or $\pm 5°$ C., about the desired operating temperature, it is possible to make simplifying assumptions about the change in electrolyte conductivity with temperature without any significant loss in accuracy in the overall system.

As an example, the fractional change in specific resistance per ° C., with temperature is nearly constant in the range 30° to 50° C., for solutions of sodium chloride. At a concentration of 200 gms per litre the fractional change per ° C. is $1.77 \times 10^{-2}$ between 30° C. and 50° C. Thus a 1.77% change in voltage is necessary to counteract the effect of 1° C. change in electrolyte temperature. At a nominal voltage of 20 volts, and a selected temperature of 40° C., the voltage should be adjusted to 21.8 volts at 35° C. and 18.2 volts at 45° C.

Whilst particular embodiments have been described, it will be understood that various modifications may be made without departing from the scope of this invention.

I claim:
1. Apparatus for carrying out electrochemical machining comprising a workpiece and a tool connected in an electric circuit with a voltage stabilized power supply so that the workpiece forms an anode and the tool a cathode, means for flowing an electrolyte through a gap between the tool and the workpiece at a substantially constant rate, means for relatively moving the tool towards the workpiece at a constant advance rate as the material of the workpiece is removed, means for producing a signal dependent on the electrolyte conductivity and means for controlling the voltage applied between the tool and the workpiece across the working gap by means of the signal dependent on the electrolyte conductivity, whereby a substantially constant equilibrium working gap can be maintained throughout a machining operation.

2. Apparatus as claimed in claim 1 in which the signal dependent on electrolyte conductivity is obtained by means performing a direct measurement of the conductivity of the electrolyte.

3. Apparatus as claimed in claim 1, in which the signal dependent on electrolyte conductivity is obtained by means measuring the temperature of the electrolyte.

4. Apparatus as claimed in claim 1, in which the voltage applied across the working gap from the power supply is controlled by an error signal derived from a first comparison circuit, and means for feeding the comparison circuit with the output voltage of the power supply and with a control voltage.

5. Apparatus as claimed in claim 4, in which the control voltage is derived from the output of a second comparison circuit, and means for feeding said second comparison circuit with a reference signal and the signal dependent upon the electrolyte conductivity.

6. Apparatus as claimed in claim 5, in which the signal dependent on electrolyte conductivity is derived from a third comparison circuit and means for feeding the third comparison circuit with a further reference signal and a signal proportional to electrolyte conductivity.

7. Apparatus for carrying out electrochemical machining comprising a workpiece and a tool connected in an electric circuit with a voltage stabilized power supply so that the workpiece forms an anode and the tool a cathode, means for flowing an electrolyte through a gap between the tool and the workpiece at a substantially constant rate, means for relatively moving the tool towards the workpiece at a constant advance rate as the material of the workpiece is removed, means for producing a signal dependent on the electrolyte conductivity and means for controlling the voltage applied by the power supply between the tool and the workpiece across the working gap by means of the signal dependent on the electrolyte conductivity, said controlling means including an error signal fed to the power supply and derived from a first comparison circuit, means for feeding said first comparison circuit with the output voltage of the power supply and with a control voltage, a second comparison circuit producing the control voltage, means for feeding said second comparison circuit with a reference signal equalling the desired voltage across the working gap and a signal dependent upon the electrolyte conductivity, a third comparison circuit and means for feeding the third comparison circuit, with a further reference signal equalling the desired electrolyte conductivity and a signal proportional to electrolyte conductivity.

8. A method of carrying out electrochemical machining in which a workpiece and a tool are connected in an electric circuit with a voltage stabilized power supply so that the workpiece forms an anode and the tool a cathode and an electrolyte is flowed through a gap between the tool and the workpiece, at a substantially constant rate, said method including the steps of relatively moving the tool towards the workpiece at a constant advance rate as the material of the workpiece is removed, producing an output signal dependent on the electrolyte conductivity and, controlling the voltage applied between the tool and the workpiece across the working gap by means of the signal dependent on the electrolyte conductivity, whereby a substantially constant equilibrium working gap can be maintained throughout a machining operation.

9. A method as claimed in claim 8, in which the signal dependent on electrolyte conductivity is obtained by a direct measurement of the conductivity of the electrolyte.

10. A method as claimed in claim 8, in which the signal dependent on electrolyte conductivity is obtained by measuring the temperature of the electrolyte.

11. A method as claimed in claim 8, in which the voltage applied across the working gap is controlled by an error signal derived from a comparison of the output voltage of the power supply and a control voltage.

12. A method as claimed in claim 11, in which the control voltage is derived from a comparison of a reference signal related to the desired voltage across the working gap and the signal dependent upon the electrolyte conductivity.

13. A method as claimed in claim 12, in which the signal dependent on electrolyte conductivity is derived from a comparison of a further reference signal related to the desired electrolyte conductivity and a signal proportional to electrolyte conductivity.

References Cited

UNITED STATES PATENTS

| | | | |
|---|---|---|---|
| 3,219,564 | 11/1965 | Wilkinson | 204—143 |
| 3,228,863 | 1/1966 | Wanttaja | 204—143 |
| 3,275,538 | 9/1966 | Haupt et al. | 204—143 |
| 3,372,099 | 3/1968 | Clifford | 204—143 |

ROBERT K. MIHALEK, *Primary Examiner.*

U.S. Cl. X.R.

204—224, 228; 219—69